United States Patent Office 3,808,247
Patented Apr. 30, 1974

3,808,247
METHOD OF PRODUCING FLUOROCYCLOPROPYL DERIVATIVES OF SILANES AND NOVEL FLUOROCYCLOPROPYL DERIVATIVES OF SILANES
Vladimir Florovich Mironov, ulitsa Gubkina 4, kv. 13; and Viktor Dmitrievich Sheludyakov, ulitsa Metallurgov 32, korpus 1, kv. 22, both of Moscow, U.S.S.R.; Olimpiada Mikhailovna Radkova, prospekt khimikov 37, kv. 21, Kaliniskoi oblasti, Redkino, U.S.S.R.; Vladimir Ivanovich Andreev, ulitsa Lermontova 2, kv. 55, Zaporozhie, U.S.S.R.; and Marta Pavlovna Forost, ulitsa parkovaya 14, kv. 11, Kalininskoi oblasti, Redkino, U.S.S.R.
No Drawing. Filed Apr. 20, 1972, Ser. No. 245,740
Int. Cl. C07f 7/08
U.S. Cl. 260—448.2 R     3 Claims

ABSTRACT OF THE DISCLOSURE

A method of producing fluorocyclopropyl derivatives of silanes of the general formula

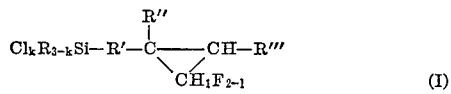

(I)

where
R is methyl, ethyl or phenyl;
R' is a bivalent radical —$(CH_2)_m$— with $m=0, 1, 2, 3$; ortho-, meta- or para-phenylene;
R'' is hydrogen, methyl or phenyl;
R''' is hydrogen, methyl, phenyl or a group $Cl_kR_{3-k}Si$;
$k=0, 1, 2, 3$;
$l=0$ or 1, residing in that unsaturated organosilicon compounds of the general formula

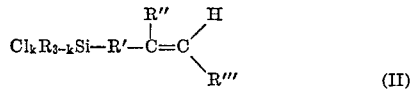

(II)

where R, R', R'', R''' and k are as defined above, are reacted with fluorinated hydrocarbons of the general formula $C_pF_qH_{2p-q+2}$ (III) where $p=1, 2, 3$ and $q=1$ to 6, or of the general formula $C_pF_qH_{2p-q}$ (IV) where $p=2$ and $q=1$ to 6. The process is carried out in the gaseous phase at a temperature ranging from 350 to 650° C. and with a molar ratio of unsaturated organosilicon compounds to fluorinated hydrocarbons equal to 1:1–10, respectively.

The present method is simple technologically, obviates the use of toxic reagents and allows the desired products to be produced with a high yield (49 to 94% for the reacted silane).

With this method, novel chemical compounds are produced, namely, fluorocyclopropyl derivatives of silanes of the general formula

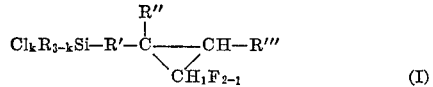

(I)

wherein R is methyl or phenyl and R', R'', R''', and l are as defined hereinabove and K is an integer from 1–3.

Said compounds can be used for the synthesis of polyorganosiloxanes that feature a number of valuable properties, namely, high oil-, fuel-, frost- and thermal resistance, etc.

---

The present invention relates to methods of producing fluorocyclopropyl derivatives of silanes of the general formula

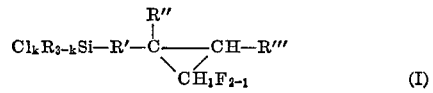

(I)

where
R is methyl, ethyl or phenyl;
R' is a bivalent radical —$(CH_2)_m$— with $m=0, 1, 2, 3$; ortho-, meta- or para-phenylene;
R'' is hydrogen, methyl or phenyl;
R''' is hydrogen, methyl, phenyl or a group $Cl_kR_{3-k}Si$;
$k=0, 1, 2, 3$;
$l=0$ or 1, and also to novel fluorocyclopropyl derivatives of silanes.

Known in the art is a method of producing difluorocyclopropyl-containing compounds of the trialkylsilyl series conforming to Formula I, this method consisting in reacting alkenyltrialkyl silanes with a mixture of trimethyltrifluoromethyltin and sodium iodide in the medium of a solvent which is ethylene glycol dimethyl ether.

The process can be represented schematically as follows:

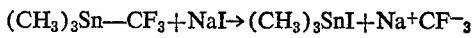

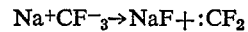

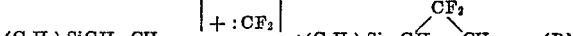

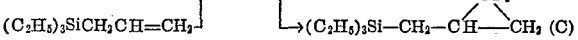

The yield of the product (A) is 45%, the yield of the product (B) is 22% and the yield of the product (C) is 80% of the theoretical quantity, respectively.

The known method, however, has a number of disadvantages, the most essential of them being:
(1) the necessity of working with critical and highly toxic trimethyltrifluoromethyltin;
(2) the presence of considerable quantities of side products, namely, of trimethyltin iodide and sodium fluoride;
(3) the use of a solvent;
(4) the necessity of precipitating a trimethyltin complex with ammonia, which complicates the process as a whole and makes the method inapplicable for synthesizing compounds with chlorine atoms bonded with silicon;
(5) a relatively low yield of the desired products when working with alkenyltrialkyl silanes.

It is an object of the present invention to broaden the range of the initial unsaturated organosilicon compounds and fluorine-containing compounds for producing fluorocyclopropyl derivatives of silanes of the General Formula I.

Another object of the invention is to provide a technologically simple method of producing fluorocyclopropyl derivatives of silanes, in which the use of critical and highly toxic trimethyltrifluoromethyltin would be obviated.

Still another object of the invention is to enhance the yield of the desired products.

In accordance with the said and other objects the present invention resides in that unsaturated organosilicon compounds of the general formula

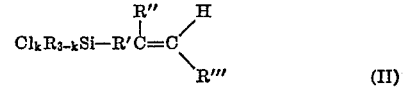

(II)

where
R is methyl, ethyl or phenyl;
R' is a bivalent radical —$(CH_2)_m$— with $m=0, 1, 2, 3$; ortho-, meta- or para-phenylene;
R'' is hydrogen, methyl or phenyl;
R''' is hydrogen, methyl, phenyl or a group $Cl_kR_{3-k}Si$;
$k=0, 1, 2, 3$, are reacted with fluorinated hydrocarbons of the general formula $$C_pF_qH_{2p-q+2} \quad (III)$$

where $p=1, 2, 3$ and $q=1$ to 6, or of the general formula $$C_pF_qH_{2p-q} \quad (IV)$$

where $p=2$ and $q=1$ to 6.

The process of reacting the unsaturated organosilicon compounds of the General Formula II with the fluorinated hydrocarbons of the General Formula III or IV is carried out in a gaseous phase at a temperature of 350 to 650° C. and with a molar ratio of the unsaturated organosilicon compounds to fluorinated hydrocarbons equal to 1:1–10, respectively.

The running of the process in the gaseous phase has become possible due to the use of a source of monofluorocarbene (:CHF) or of difluorocarbene (:CF$_2$) of fluorinated hydrocarbons of the methane and ethylene series, which are easily available products that have found wide industrial application.

The process of interaction of unsaturated organosilicon compounds, e.g., of vinyltrichlorosilane, with fluorinated hydrocarbons, e.g., with difluorochloromethane, proceeds according to the scheme:

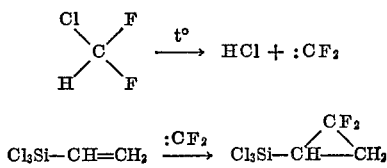

For diminishing the formation of by-product compounds and thus for enhancing the yield of the desired products, it is reasonable that the process should be carried out at a temperature below that of the isomerization and pyrolysis of the desired products, that is at a temperature ranging from 490 to 520° C.

The present method of producing fluorocyclopropyl derivatives of silanes conforming to the General Formula I is simple technologically, it does not require the use of toxic reagents and ensures a high yield of the desired products (49 to 94% for the reacted silane).

With the present method, novel chemical compounds can be produced which also constitute an object of the present invention. The novel chemical compounds—fluorocyclopropyl derivatives of silanes—are characterized by the General Formula I when R is methyl, ethyl or phenyl. These compounds can be used for synthesizing polyorganosiloxanes noted for their high oil-, fuel-, frost- and thermal resistance and also featuring lubricating power, liability to isomerization, and vulcanizability.

The present method of producing fluorocyclopropyl derivatives of silanes of the General Formula I is performed as follows.

A gaseous fluorinated hydrocarbon is passed through an unsaturated organosilicon compound heated to a temperature not exceeding the boiling point thereof. The resulting vapor-and-gas mixture is fed to a tubular reactor preheated to a temperature of 350 to 650° C. From the reactor the resulting mixture of products is fed to a cooler and then taken over to rectification.

The present method can also be performed by feeding an unsaturated organosilicon compound batchwise to a reactor preheated to a temperature of 350 to 650° C., while passing a gaseous fluorinated hydrocarbon therethrough.

For a better understanding of the present invention, given hereinbelow are examples illustrating the production of fluorocyclopropyl derivatives of silanes.

EXAMPLE 1

A three-neck 250 ml. flask equipped with a bubbler, a thermometer and a Wurtz tube was charged with 244 g. (1.5 mole) of vinyltrichlorosilane heated to a temperature of 75° C., and then gaseous difluorochloromethane was passed therethrough at a rate of 43.2 g. (0.5 mole) per hour. The bubbling conditions were such as to ensure the entrainment of not more than 0.5 mole of vinyltrichlorosilane from the flask. The level of vinyltrichlorosilane in the flask was maintained constant with the help of a dropping funnel. The vapor-and-gas mixture of approximately equimolar quantities of the two reagents was passed through a silica pipe (1,000 mm. long and 28 mm. in diameter) heated to 490 to 550° C. Then the mixture was supplied to a condenser. The condensate was collected and then distilled on a rectifying column 20 mm. in diameter and with a packing 1,000 mm. high.

15.8 g. of gem-difluorocyclopropyltrichlorosilane were obtained (15% of the theoretical quantity or 82.4% for the reacted vinyltrichlorosilane) with a B.P. of 122 to 123° C. at 743 mm. Hg, $d_4^{20}=1.4420$ and $n_D^{20}=1.4190$.

Found, percent: Cl, 50.00, 50.10; F, 17.70, 17.78; Si, 13.14; 13.08. C$_3$H$_3$SiF$_2$Cl$_3$. Calc., percent: Cl, 50.26; F, 17.26; Si, 13.27.

The NMR spectra in the case of H$^1$ nuclei were characterized by the chemical shift $\delta_{C-H}$ equal to 1.6±0.1 p.p.m. with respect to tetramethyl silane (internal standard), and in case of F$^{19}$ nuclei, by the chemical shift $\delta_{C-F}$ equal to 514.2 p.p.m. with respect to trifluoroacetic acid (external standard). The relative chemical shift of signals of two non-equivalent fluorine atoms was 3.4 p.p.m., and the spin-spin interaction constant I$_{F-F}$ was 152.8 Hz.

Absorption bands characteristic for the double bond were not observed in the IR-spectrum.

Besides the desired product, there were obtained 14.8 g. of 3,3-difluoropropenyltrichlorosilane (ca. 14% of the theoretical quantity) with a B.P. of 112 to 114° C. at 743 mm. Hg. The IR-spectrum contained $\nu_{C=C}$ 1,745 and $\nu_{C-H}$ 3,100 cm.$^{-1}$ absorption bands.

EXAMPLE 2

A vapor-and-gas mixture consisting of equimolar quantities of vinyltrichlorosilane and tetrafluoroethylene and prepared as described in Example 1 was passed through a silica pipe heated in a nitrogen atmosphere to 500–540° C. The mixture was fed at a rate of 50 g. (0.19 mole) per hour.

48 g. of a condensate were obtained, from which 8.5 g. of gem-difluorocyclopropyltrichlorosilane were separated by distillation (17% of the theoretical quantity), with a B.P. of 121 to 123° C. and $n_D^{20}=1.4417$.

EXAMPLE 3

A vapor-and-gas mixture consisting of equimolar quantities of vinyltrichlorosilane and 1,1-difluoro-2-methane and prepared as described in Example 1 was passed through a silica pipe at a temperature of 505 to 545° C. at a rate of 0.15 mole per hour.

A condensate was obtained containing 20.5 wt. percent of gem-difluorocyclopropyltrichlorosilane. Rectification gave 6.1 g. (17.9% of the theoretical amount) of gem-difluorocyclopropyltrichlorosilane with a B.P. of 120 to 122° C.

EXAMPLE 4

A vapor-and-gas mixture consisting of equimolar quantities of vinyltrichlorosilane and 1,1-difluoro-2-chloropropane and prepared as described in Example 1 was passed through a silica pipe at a temperature of 505 to 545° at a rate of 0.15 mole per hour.

After condensation and distillation gem-difluorocyclopropyltrichlorosilane was obtained with a yield equal to 16% of the theoretical quantity, B.P. 122 to 123° C., $n_D^{20}=1.4420$.

EXAMPLE 5

52 g. (1 mole) of gaseous difluoromethane were bubbled through vinyltrichlorosilane heated to 60° C. at a rate ensuring the entrainment of 16.1 g. (0.1 mole) of vinyltrichlorosilane per hour. The resulting vapor-and-gas mixture was passed through a silica pipe at a temperature of 505 to 545° C.

82.5 g. of a condensate were obtained, from which 12.1 g. (11.4% of the theoretical quantity) of gem-difluorocyclopropyltrichlorosilane were separated by distillation, B.P. 121 to 123° C. and $n_D^{20}$=1.4415.

EXAMPLE 6

Through a silica pipe filled with crushed quartz and heated to a temperature of 515±10° C. in a nitrogen atmosphere a vapor-and-gas mixture consisting of 53.7 g. (0.25 mole) of allylmethylphenyldichlorosilane and 30.3 g. (0.25 mole) of difluorodichloromethane was passed. After the distillation of the condensate there were obtained 7.3 g. (12% of the theoretical quantity) of gem-difluorocyclopropylmethylphenyldichlorosilane with a B.P. of 74 to 76° C. at 10 mm. Hg and $n_D^{20}$=1.5211.

Found, percent: Cl, 26.30, 26.17; Si, 10.20, 10.18; F, 14.27, 14.40. $SiC_{10}H_{10}Cl_2F_2$. Calc., percent: Cl, 26.55; Si, 10.5; F, 14.20.

Some other examples of producing fluorocyclopropyl derivatives of silanes and their properties are presented in the table which follows.

TABLE

| | Starting reagents | | Rate of feed of reagents, g./hr. | | Reaction temperature, °C. | Yield of product, percent | | Reaction time, hrs. | Properties of resulting compound | | |
|---|---|---|---|---|---|---|---|---|---|---|---|
| | Unsaturated organosilicon compound | Source of fluorocarbenes (fluorinated hydrocarbon) | Fluorinated hydrocarbon | Unsaturated organosilicon compound | | For reacted silane | Of theoretical quantity | | B.P., °C. (P, mm. Hg) | $n_D^{20}$ | $d_4^{20}$ |
| Resulting compound | | | | | | | | | | | |
| 1 | 3 | 4 | 5 | 6 | 7 | 8 | 9 | 10 | 11 | 12 | 13 |
| 7 — $(CH_3)_3Si-\overline{CH-CH_2-CF_2}$ | $(CH_3)_3SiCH=CH_2$ | $HClCF_2$<br>$Cl_2F_2$ | 17.6<br>18.2<br>17.6 | 15.0<br>15.0<br>16.4 | 490-540<br>490-520 | 17.4<br>63.4 | 18.0<br>19.4 | 5<br>6 | 99-99.5<br>99-100 | 1.3851<br>1.3849 | 0.9276 |
| 8 — $(CH_3)_3SiCH_2-\overline{CH-CH_2-CF_2}$ | $(CH_3)_3SiCH_2CH_2CH=CH_2$ | $HClCF_3$ | 17.6 | 18.8 | 500-525 | 49.8 | 25.6 | 6 | 110-112 | 1.3899 | 0.9400 |
| 9 — $(CH_3)_3Si-\overline{CH-CH_2-CH(CH_3)}-CF_2$ | $(CH_3)_3SiCH=CHCH_3$ | $HClCF_3$ | 17.6 | 18.8 | 510-535 | 59.7 | 21.8 | 6 | 109-110 | 1.3880 | 0.9368 |
| 10 — $(CH_3)_3Si-\overline{CH-CH_2-CFH}$ | $(CH_3)_3SiCH=CH_2$ | $H_2ClCF_2$<br>$ClH_2CF$ | 13.6<br>24.2 | 26.2<br>26.2 | 500-525<br>500-525 | 67.1<br>64.8 | 7.5<br>17.1 | 6<br>6 | 105-107<br>105-107 | 1.3880<br>1.3880 | 0.9368<br>0.9368 |
| 11 — $Cl(CH_3)_2Si-\overline{CH-CH_2-CF_2}$ | $Cl(CH_3)_2SiCH=CH_2$ | $HClCF_2$<br>$CF_3CCl_2CF_2$<br>$F_2C=CF_2$ | 17.6<br>24.2<br>20.0 | 25.4<br>25.4<br>19.8 | 510-515<br>510-515<br>500-515 | 81.8<br>87.6<br>90.0 | 18.4<br>14.8<br>28.6 | 5<br>5<br>5 | 118-119<br>118-119<br>118-119 | 1.4060<br>1.4060<br>1.4060 | 1.1054<br>1.1054<br>1.1054 |
| 12 — $Cl_2CH_3Si-\overline{CH-CH_2-CF_2}$ | $Cl_2CH_3SiCH=CH_2$ | $HClCF_2$<br>$Cl_2CF_2$<br>$H_2C=CF_2$<br>$CF_3CClCF_2H$ | 17.6<br>24.2<br>10.4<br>20.0<br>22.8 | 27.6<br>19.1<br>27.6<br>27.6<br>27.6 | 495-515<br>495-520<br>495-510<br>500-520<br>500-515 | 94.0<br>91.0<br>89.8<br>88.8<br>81.4 | 16.0<br>14.1<br>11.1<br>24.3<br>5.7 | 6<br>6<br>6<br>6<br>6 | 127-128<br>127-128<br>127-128<br>127-128<br>127-128 | 1.4141<br>1.4141<br>1.4141<br>1.4141<br>1.4141 | 1.2794<br>1.2794<br>1.2794<br>1.2794<br>1.2794 |
| 13 — $Cl_2CH_3Si-\overline{CH-CH_2-CHF}$ | $Cl_2CH_3SiCH=CH_2$ | $H_2ClCF$ | 13.6 | 17.3 | 500-510 | 85.5 | 7.9 | 7 | 124-125 | | |
| 14 — $Cl_3Si-\overline{CH-CH_2-CF_2}$ | $Cl_3SiCH_2CH=CH_2$ | $HClCF_2$ | 17.6 | 22.5 | 500-570 | 89.9 | 16.4 | 5 | 133-134 | 1.4151 | 1.4398 |
| 15 — $(CH_3)_3Si-\overline{CH-CH(C_6H_5)}-CF_2$ | $(CH_3)_3SiCH=CHC_6H_5$ | $HClCF_2$ | 17.6 | 33.9 | 500-560 | 90.0 | 8.8 | 5 | 114-115(10) | 1.5163 | |
| 16 — $p-(CH_3)_3SiC_6H_4\overline{CH-CH_2-CF_2}$ | $p-(CH_3)_3SiC_6H_4CH=CH_2$ | $HClCF_2$<br>$Cl_2CF_2$ | 17.6<br>24.2 | 33.9<br>22.6 | 510-575<br>510-575 | 70.3<br>69.7 | 10.1<br>15.4 | 5<br>5 | 110-113(10)<br>110-113(10) | 1.5200<br>1.5200 | |
| 17 — $(CH_3)_3SiCH=\overline{CH-CH[Si(CH_3)_3]}-CF_2$ | $(CH_3)_3SiCH=CHSi(CH_3)_3$ | $HClCF_2$ | 35.2 | 22.2 | 500-550 | 60.5 | 12.1 | 6 | 70-72(10) | 1.4280 | |
| 18 — $C_2H_5Cl_2Si-\overline{CH-CH_2-CF_2}$ | $C_2H_5Cl_2SiCH=CH$ | $HClCF_2$<br>$Cl_2CF_2$ | 17.6<br>24.2 | 20.5<br>30.7 | 510-550<br>510-550 | 6.4<br>63.8 | 11.0<br>9.4 | 6<br>6 | 115-116<br>115-116 | 1.4255<br>1.4255 | 1.2717<br>1.2717 |
| 19 — $C_6H_5Cl_2Si\overline{CH-CH_2-CF_2}$ | $C_6H_5Cl_2SiCH=CH_2$ | $HClCF_2$<br>$Cl_2CF_2$ | 17.6<br>24.2 | 25.3<br>25.3 | 500-515<br>600-650 | 68.8<br>69.3 | 12.4<br>11.8 | 6<br>5 | 71-73(10)<br>71-73(10) | 1.5230<br>1.5230 | |
| 20 — $C_6H_5Cl_2Si\overline{CH-CH_2-CHF}$ | $C_6H_5Cl_2SiCH=CH_2$ | $H_2CF_2$ | 15.6 | 23.4 | 490-510 | 60.1 | 11.8 | 5 | 70-72(10) | 1.5200 | |

TABLE

| Resulting compound | Starting reagents | | Rate of feed of reagents, g./hr. | | Reaction temperature, °C. | Yield of product, percent | | Reaction time, hrs. | Properties of resulting compound | | |
| | Unsaturated organosilicon compound | Source of fluorocarbenes (fluorinated hydrocarbon) | Fluorinated hydrocarbon | Unsaturated organosilicon compound | | For reacted silane | Of theoretical quantity | | B.P., °C. (P, mm. Hg) | $n_D^{20}$ | $d_4^{20}$ |
| --- | --- | --- | --- | --- | --- | --- | --- | --- | --- | --- | --- |
| 1 | 2 | 3 | 4 | 5 | 6 | 7 | 8 | 9 | 10 | 11 | 12 | 13 |
| 21 | Cl₃Si—CH—CH(SiCl₃)—CF₂ | Cl₃SiCH=CHSiCl₃ | HClCF₂ | 17.6 | 29.0 | 490–510 | 71.8 | 13.2 | 6 | 96–97(10) | 1.4961 | |
| 22 | C₆H₅Cl₂Si—CH₂—CH—CH₂—CF₂ | C₆H₅Cl₂SiCH₂—CH=CH₂ | HClCF₂ | 17.6 | 26.6 | 495–505 | 75.5 | 12.7 | 6 | 74–76(10) | 1.5211 | |
| 23 | (CH₃)₃Si—C(CH₃)—CH₂—CF₂ | (CH₃)₃SiC(CH₃)=CH₂ | HClCF₂ | 20.3 | 17.6 | 500–510 | 79.0 | 12.1 | 6 | 109–110 | 1.3880 | 0.9360 |
| 24 | (CH₃)₃Si—C(C₆H₅)—CH₂—CF₂ | (CH₃)₃SiC(C₆H₅)=CH₂ | ClHCF₂ | 17.9 | 17.6 | 500–515 | 78.0 | 14.0 | 6 | 114–115(10) | 1.5158 | |
| 25 | CH₃Cl₂Si—(CH₂)₂—CH—CH₂—CF₂ | CH₃Cl₂Si(CH₂)₂CH=CH₂ | ClHCF₂ | 18.4 | 17.6 | 500–510 | 80.0 | 12.1 | 6 | 140–142 | | |
| 26 | (CH₃)₃SiCH=CHSi(C₆H₅)₂—CF₂ | (CH₃)₃SiCH=CHSi(C₆H₅)₂ | ClHCF₂ | 19.3 | 17.6 | 500–510 | 85.0 | 10.0 | 6 | | | |
| 27 | CH₃Cl₂Si—CH—CH(SiCH₂Cl₂)—CF₂ | CH₃Cl₂SiCH=CHSiCl₂CH₃ | CF₃CH₂CF₂Cl | 21.5 | 27.6 | 480–520 | 90.3 | 5.0 | 6 | 70–73(6) | | |

What is claimed is:

1. A method of producing a fluorocyclopropylsilane of the formula

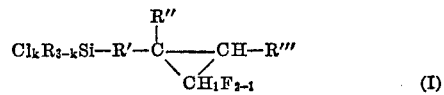

(I)

where

R is a radical selected from the group consisting of methyl, ethyl and phenyl;

R' is a radical selected from the group consisting of a bivalent radical —(CH₂)ₘ—, where m is an integer with values ranging from 0 to 3, ortho-, meta- and para-phenylene;

R" is a radical selected from the group consisting of hydrogen, methyl and phenyl;

R'" is a radical selected from the series consisting of hydrogen, phenyl and a group $Cl_kR_{3-k}Si$;

k is an integer with values ranging from 0 to 3;

l is an integer with values ranging from 0 to 1, comprising reacting an unsaturated organosilicon compound of the formula

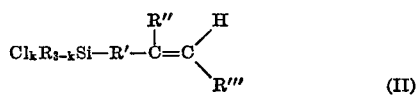

(II)

where

R is a radical selected from the group consisting of methyl, ethyl and phenyl;

R' is a radical selected from the group consisting of a bivalent radical —(CH₂)ₘ—, where m is an integer with values ranging from 0 to 3, ortho-, meta- and para-phenylene;

R" is a radical selected from the group consisting of hydrogen, methyl and phenyl;

R'" is a radical selected from the series consisting of hydrogen, methyl, phenyl and a group $Cl_kR_{3-k}Si$;

k is an integer with values ranging from 0 to 3, with a fluorinated hydrocarbon selected from the group consisting of compounds of the general formula $C_pF_qH_{2p-q+2}$ (III) where p is an integer ranging from 0 to 3 and q is an integer ranging from 1 to 6 and of compounds of the general formula $C_pF_qH_{2p-q}$ (IV) where p=2 and q is an integer ranging from 1 to 6, the process being carried out in the gaseous phase at a temperature ranging from 350 to 650° C. and with a molar ratio of said unsaturated organosilicon compound to said fluorinated hydrocarbon equal to 1:1–10 respectively.

2. A method as in claim 1, wherein the process is carried out at a temperature ranging from 490 to 520° C.

3. A fluorocyclo propylsilane of the formula

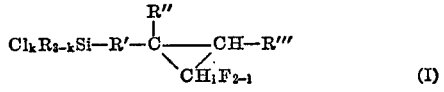

(I)

where

R is a radical selected from the group consisting of methyl, ethyl and phenyl;

R' is a radical selected from the group consisting of a bivalent radical —(CH$_2$)$_m$—, where $m$ is an integer ranging from 0 to 3, ortho-, meta- and para-phenylene;

R" is a radical selected from the group consisting of hydrogen, methyl and phenyl;

R''' is a radical selected from the series consisting of hydrogen, methyl, phenyl and a group Cl$_k$R$_{3-k}$Si;

$k$ is an integer ranging from 1 to 3;

$l$ is an integer ranging from 0 to 1.

References Cited
UNITED STATES PATENTS

| 2,800,494 | 7/1957 | Haluska | 260—448.2 R |
| 2,884,433 | 4/1959 | Smith | 260—448.2 R |
| 2,911,428 | 11/1959 | Tarrant | 260—449.2 R |

DANIEL E. WYMAN, Primary Examiner

P. F. SHAVER, Assistant Examiner